(12) United States Patent
Chang

(10) Patent No.: US 11,444,471 B2
(45) Date of Patent: Sep. 13, 2022

(54) CHARGING CASE

(71) Applicant: MERRY ELECTRONICS (SHENZHEN) CO., LTD., Guangdong (CN)

(72) Inventor: Hsiang-Sen Chang, Taichung (TW)

(73) Assignee: MERRY ELECTRONICS (SHENZHEN) CO., LTD., Guangdong (CN)

(*) Notice: Subject to any disclaimer, the term of this patent is extended or adjusted under 35 U.S.C. 154(b) by 401 days.

(21) Appl. No.: 16/847,638

(22) Filed: Apr. 13, 2020

(65) Prior Publication Data

US 2020/0412143 A1  Dec. 31, 2020

(30) Foreign Application Priority Data

Jun. 25, 2019  (TW) .................. 108122209
Feb. 3, 2020  (TW) .................. 109103252

(51) Int. Cl.
| | |
|---|---|
| *H02J 7/00* | (2006.01) |
| *A45C 11/24* | (2006.01) |
| *A45C 15/00* | (2006.01) |
| *H04R 1/10* | (2006.01) |
| *A45C 11/00* | (2006.01) |

(52) U.S. Cl.
CPC ............ *H02J 7/0044* (2013.01); *A45C 11/24* (2013.01); *A45C 15/00* (2013.01); *H04R 1/1025* (2013.01); *A45C 2011/001* (2013.01)

(58) Field of Classification Search
USPC ................. 320/106, 107, 108, 109, 110
See application file for complete search history.

(56) References Cited

U.S. PATENT DOCUMENTS 8,617,741 B2 * 12/2013 Takeshita ............ H01M 50/107
                                                              429/123

FOREIGN PATENT DOCUMENTS

| CN | 110176799 A | * | 8/2019 |
|---|---|---|---|
| JP | 2008099347 A | * | 4/2008 |

* cited by examiner

*Primary Examiner* — Brian Ngo
(74) *Attorney, Agent, or Firm* — CKC & Partners Co., LLC

(57) ABSTRACT

A charging case includes a main body, a lid and an actuating mechanism. The main body has an accommodating space extending along an axial direction. The lid is pivotably connected to the main body and has a guiding bump which swings as the lid is opened or closed. The actuating assembly includes a slider and a return mechanism. The slider is slidably disposed in the accommodating space and is configured to reciprocate along the axial direction as the guiding bump swings and pushes the slider. The return mechanism is connected to the slider and is configured to provide the slider with a force in the axial direction.

20 Claims, 14 Drawing Sheets

CHARGING CASE

RELATED APPLICATIONS

This application claims priority to Taiwan Application Serial Number 108122209, filed Jun. 25, 2019, and Taiwan Application Serial Number 109103252, filed Feb. 3, 2020, the disclosures of which are incorporated herein by reference in their entireties.

BACKGROUND

Technical Field

The present disclosure relates to a charging case.

Description of Related Art

Charging cases serve to hold accessories such as Bluetooth earphones and can charge the accessories when being connected to a power source. User experience regarding opening and closing the lid of a charging case depends on the hinge design of the charging case. A common hinge design is to form bumps on the hinge and to limit the maximum angle that the lid can be opened by engaging the bumps. A torsion spring may be included optionally to keep the lid at a fixed angle when the lid is opened.

Said hinge design have the following drawbacks: (1) the torsion spring is exposed, which negatively affects the appearance of the charging case; (2) the torque provided by the torsion spring reaches maximum when the lid is closed, therefore, the lid may open inadvertently when the charging case experiences slight impact, and the lid opens too fast, resulting in poor user experience; and (3) the bumps may be worn out and become unable to limit the opening angle of the lid as the lid is repeated opened and closed.

In addition, charging cases are typically compact in size and thus must use tiny hinge structures. Hinge structures for eyeglass cases (e.g., SF hinge) are too large for charging cases despite being capable of keeping the lid at a fixed angle. Moreover, hinge structures for eyeglass cases are also exposed and visible from the outside, and thus have negative impact on the appearance of the product.

SUMMARY

In view of the foregoing, one of the objects of the present disclosure is to provide a novel charging case that resolves the issues mentioned above.

To achieve the objective stated above, in accordance with an embodiment of the present disclosure, a charging case includes a main body, a lid and an actuating mechanism. The main body has an accommodating space extending along an axial direction. The lid is pivotably connected to the main body to be switched between an open state and a closed state. The lid has a guiding bump which swings as the lid is opened or closed. The actuating assembly includes a slider and a return mechanism. The slider is slidably disposed in the accommodating space and includes an engaging portion positioned corresponding to the guiding bump. The slider is configured to reciprocate along the axial direction as the guiding bump swings and pushes the engaging portion. The engaging portion includes a sloping surface and an abutting surface connected to each other. The return mechanism is connected to the slider and is configured to provide the slider with a force in the axial direction.

In one or more embodiments of the present disclosure, an angle between the abutting surface and the sloping surface substantially ranges from 30 degrees to 180 degrees.

In one or more embodiments of the present disclosure, the actuating assembly further includes a frame fixedly disposed on the main body. The accommodating space is defined between the frame and a wall portion of the main body.

In one or more embodiments of the present disclosure, the lid has a rib structure located on a side of the guiding bump. When the lid is in the open state, the rib structure abuts against the wall portion, so as to impede rotation of the lid and to hold the lid at a predetermined angle to the main body.

In one or more embodiments of the present disclosure, the rib structure is greater in length than the guiding bump.

In one or more embodiments of the present disclosure, the engaging portion and the wall portion form a concavity. When the lid is in the open state, the guiding bump abuts against the wall portion, so as to impede rotation of the lid and to hold the lid at a predetermined angle to the main body.

In one or more embodiments of the present disclosure, the frame has an entrance and a thru-hole. The entrance faces the guiding bump. The thru-hole is positioned opposite to the entrance. The slider further includes an extending portion and a snap portion. The extending portion is located between the snap portion and the engaging portion, and the extending portion passes through the thru-hole. The return mechanism includes a spring located inside the accommodating space and fitted on the extending portion.

In one or more embodiments of the present disclosure, the frame includes a first guiding portion and a second guiding portion. A distance between the first guiding portion and the wall portion is less than a distance between the second guiding portion and the wall portion. The slider has an indented section. The indented section is on a surface of the slider away from the wall portion. The indented section and the engaging portion slidably engage the first guiding portion and the second guiding portion respectively.

In one or more embodiments of the present disclosure, the slider further includes a restricting flange formed on the engaging portion. When the lid is in the open state, the guiding bump abuts against the restricting flange, so as to impede rotation of the lid and to hold the lid at a predetermined angle to the main body.

In one or more embodiments of the present disclosure, the engaging portion and the restricting flange collectively form a recessed portion.

In one or more embodiments of the present disclosure, the recessed portion and the guiding bump are substantially complementary in shape.

In one or more embodiments of the present disclosure, the lid is in the closed state when the guiding bump exits the recessed portion.

In one or more embodiments of the present disclosure, the predetermined angle substantially ranges from 70 degrees to 100 degrees.

In one or more embodiments of the present disclosure, the slider has a slot. The main body has a cylinder protruding from a wall portion of the main body and extending into the slot.

In one or more embodiments of the present disclosure, the actuating assembly further includes a frame fixedly attached to the main body. The accommodating space is defined between the frame and a wall portion of the main body.

In one or more embodiments of the present disclosure, the slider has an indented section. The indented section is on a surface of the slider away from the wall portion. An orthogonal projection of the frame onto the slider falls within the indented section.

In one or more embodiments of the present disclosure, the frame is spaced from an end of the indented section facing the guiding bump by a gap.

In one or more embodiments of the present disclosure, the frame has a rail. The slider has a slot slidably connected to the rail.

In one or more embodiments of the present disclosure, the rail protrudes from a side wall of the frame.

In one or more embodiments of the present disclosure, the guiding bump is configured to swing about a rotation axis. The rotation axis is nonparallel to the axial direction along which the accommodating space extends.

In sum, the charging case of the present disclosure includes a slider featured with a recessed portion which a guiding bump of the lid can swing into and out of. With the assistance of a return mechanism, the recessed portion can firmly engage the guiding bump to maintain the angle at which the lid is opened. By this arrangement, problems found in conventional hinge structures for charging cases, such as wear, inability to hold the lid at a fixed angle, and having large size, may be resolved.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

Figure 1:
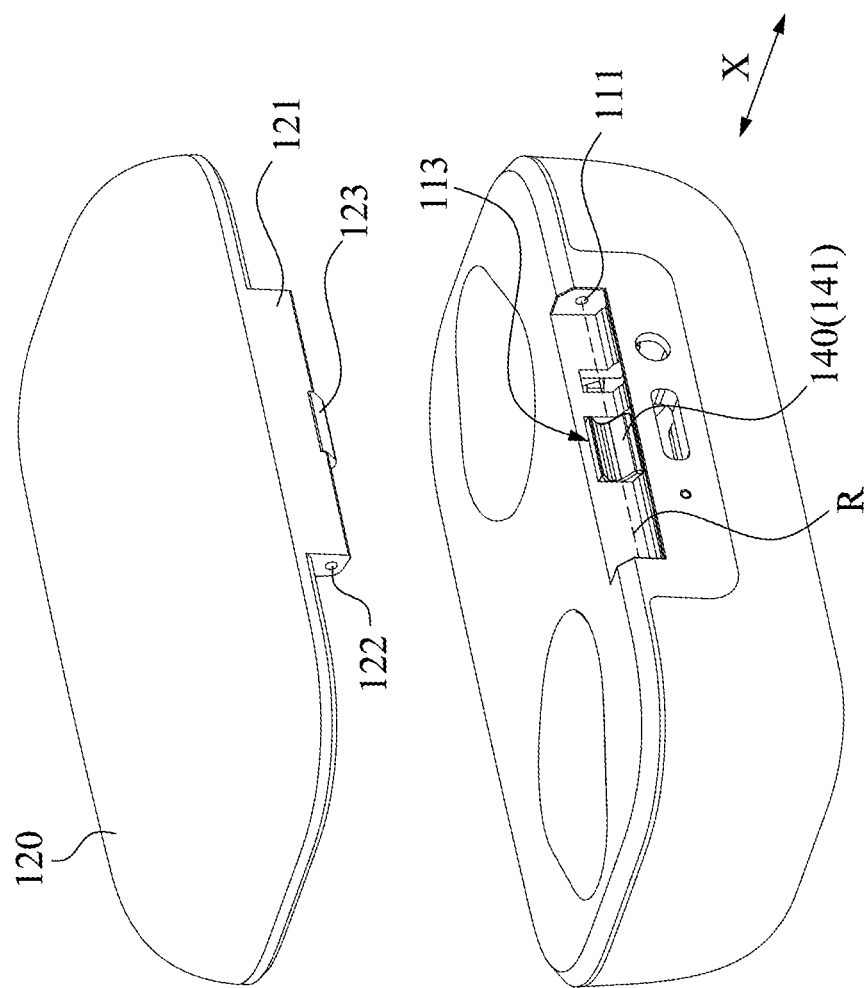
FIG. 1 illustrates an exploded view of a charging case in accordance with an embodiment of the present disclosure.

For the sake of the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Figure 2:
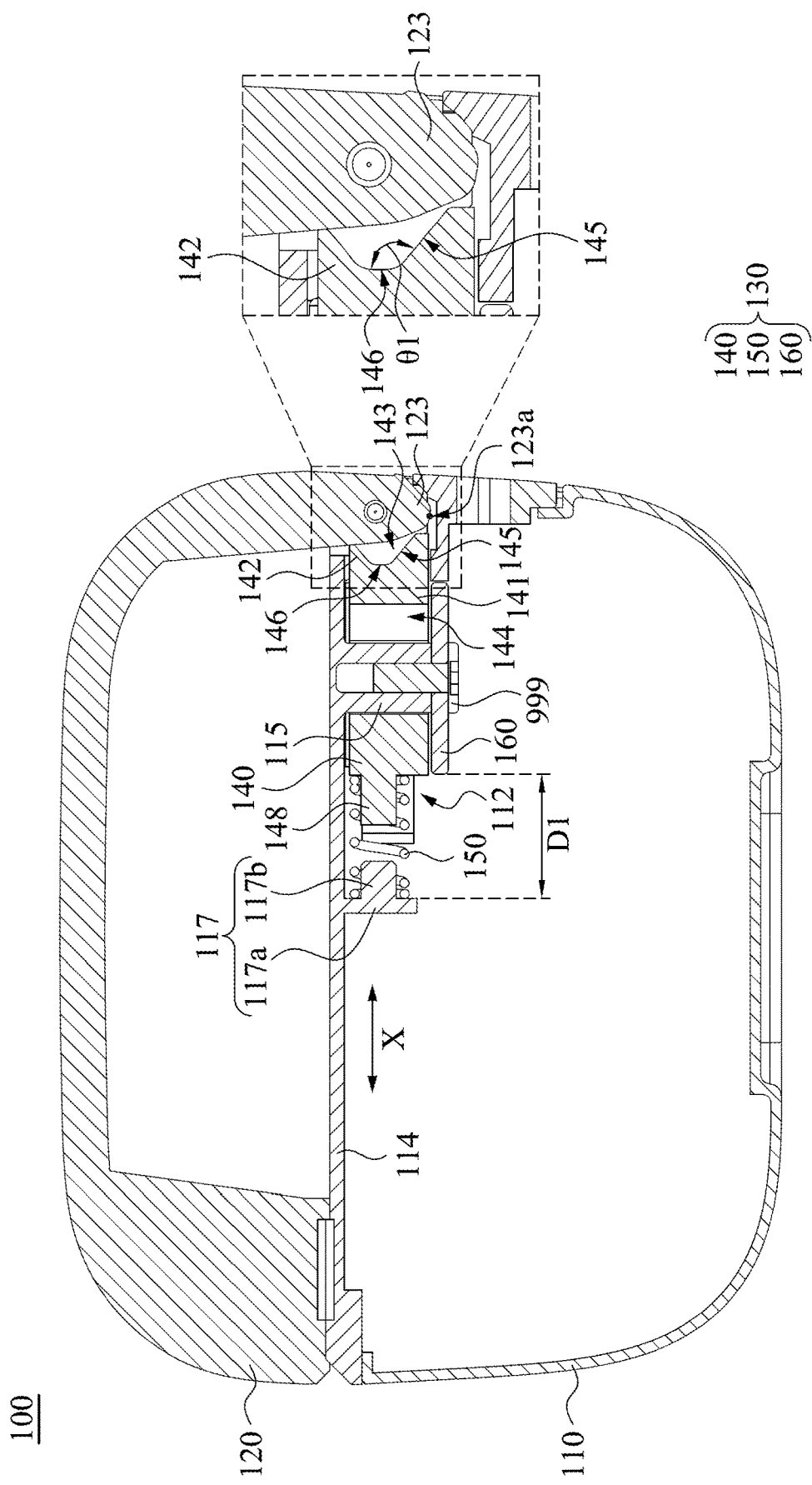
FIG. 2 illustrates an assembled cross-sectional view of the charging case shown in FIG. 1, with the lid of the charging case being in a closed state.
Figure 3:
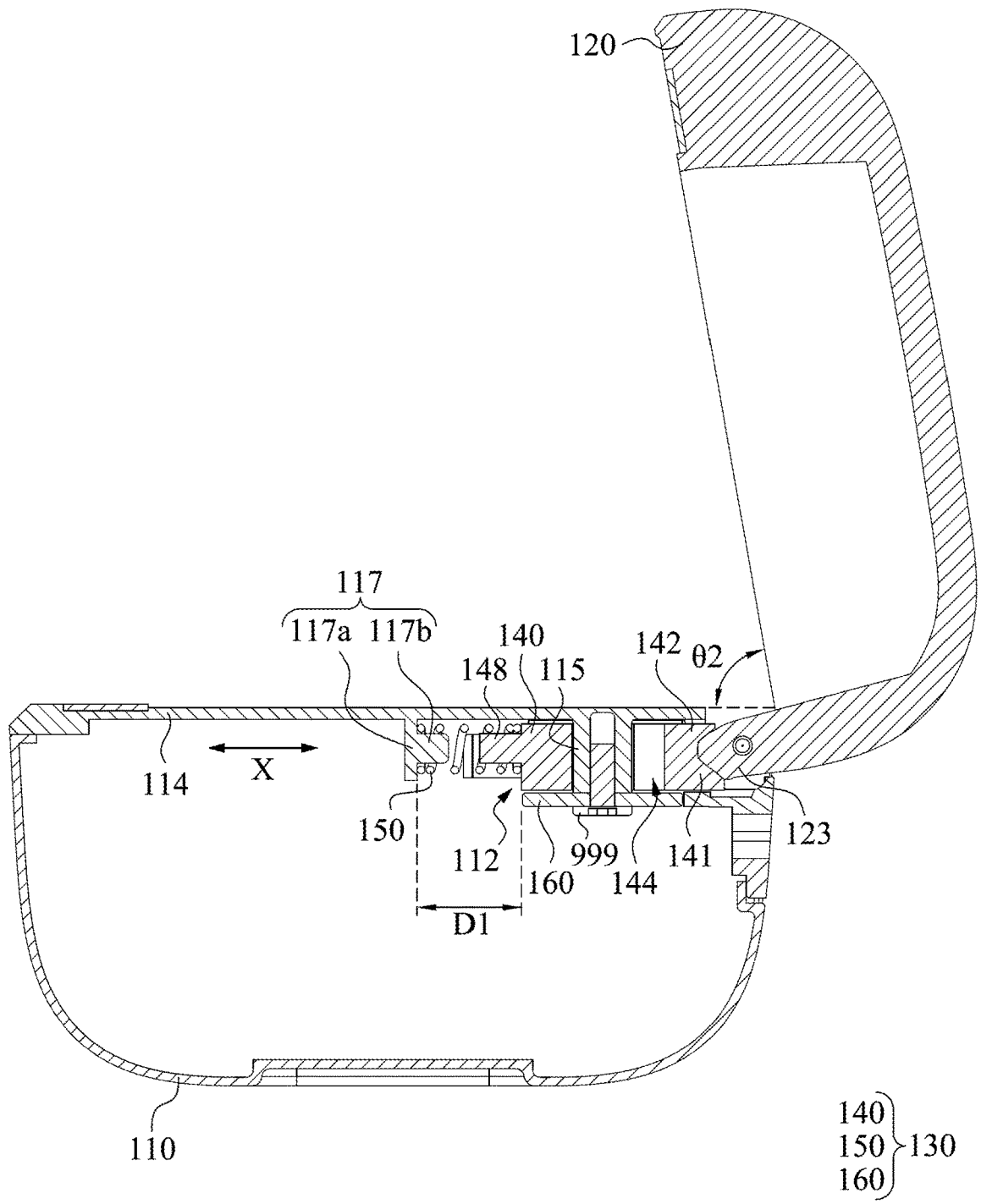
FIG. 3 illustrates an assembled cross-sectional view of the charging case shown in FIG. 1, with the lid of the charging case being in an open state.

Reference is made to FIGS. 1-3. FIG. 1 illustrates an exploded view of a charging case 100 in accordance with an embodiment of the present disclosure. FIGS. 2 and 3 illustrate assembled cross-sectional views of the charging case 100 shown in FIG. 1 in two different states. The charging case 100 includes a main body 110, a lid 120 and an actuating assembly 130 (see FIGS. 2 and 3). As shown in FIG. 1, the lid 120 has a connecting portion 121. The connecting portion 121 has two pivots 122 (only one is depicted) on its two opposite sides. The pivots 122 are pivotably connected to two pivots 111 (only one is depicted) of the main body 110 respectively, such that the lid 120 may be rotated and be switched between an open state (e.g., the state of the lid 120 as shown in FIG. 3) and a closed state (e.g., the state of the lid 120 as shown in FIG. 2). The lid 120 further has a guiding bump 123 protruding from the bottom of the connecting portion 121. The guiding bump 123 swings as the lid 120 is opened or closed.

As shown in FIGS. 2 and 3, the main body 110 is a hollow housing structure. The actuating assembly 130 is disposed in the main body 110 and includes a slider 140, a return mechanism 150 and a frame 160. The main body 110 has an accommodating space 112 extending along an axial direction X. The slider 140 is slidably disposed in the accommodating space 112, in other words, the accommodating space 112 is a sliding space for the slider 140. As shown in FIG. 1, in some embodiments, the guiding bump 123 is configured to swing about a rotation axis R. The rotation axis R is nonparallel to the axial direction X along which the accommodating space 112 extends. In some embodiments, the axial direction X is perpendicular to the rotation axis R.

As shown in FIG. 2, the slider 140 includes an engaging portion 141 and a restricting flange 142 formed on the engaging portion 141. The engaging portion 141 and the restricting flange 142 collectively form a recessed portion 143. Specifically, the engaging portion 141 has a sloping surface 145 and an abutting surface 146 connected to the sloping surface 145. The abutting surface 146 is a bottom surface of the recessed portion 143. The sloping surface 145 is inclined with respect to the abutting surface 146. The restricting flange 142 is connected to an end of the abutting surface 146 away from the sloping surface 145. In some embodiments, an angle between the abutting surface 146 and the restricting flange 142 is substantially equal to an angle 81 between the abutting surface 146 and the sloping surface 145. In some embodiments, the angle 81 substantially ranges from 120 degrees to 150 degrees, and is preferably 135 degrees.

As shown in FIG. 1, the main body 110 has an opening 113 located between the pivots 111. The engaging portion 141 of the slider 140 is positioned corresponding to the guiding bump 123 of the lid 120 and slidably engages the guiding bump 123 through the opening 113. The slider 140 is configured to reciprocate along the axial direction X as the guiding bump 123 swings and pushes the engaging portion 141. In some embodiments, the recessed portion 143 and the guiding bump 123 are substantially complementary in shape. In some embodiments, the material of the lid 120 and the slider 140 include engineering plastics such as polyoxymethylene (POM).

As shown in FIG. 3, the restricting flange 142 is configured to impede the rotation of the lid 120. When the lid 120 is in the open state, the guiding bump 123 abuts against the restricting flange 142, such that the lid 120 is held at a predetermined angle θ2 to the main body 110. In some embodiments, the predetermined angle θ2 substantially ranges from 70 degrees to 100 degrees.

Figure 4:
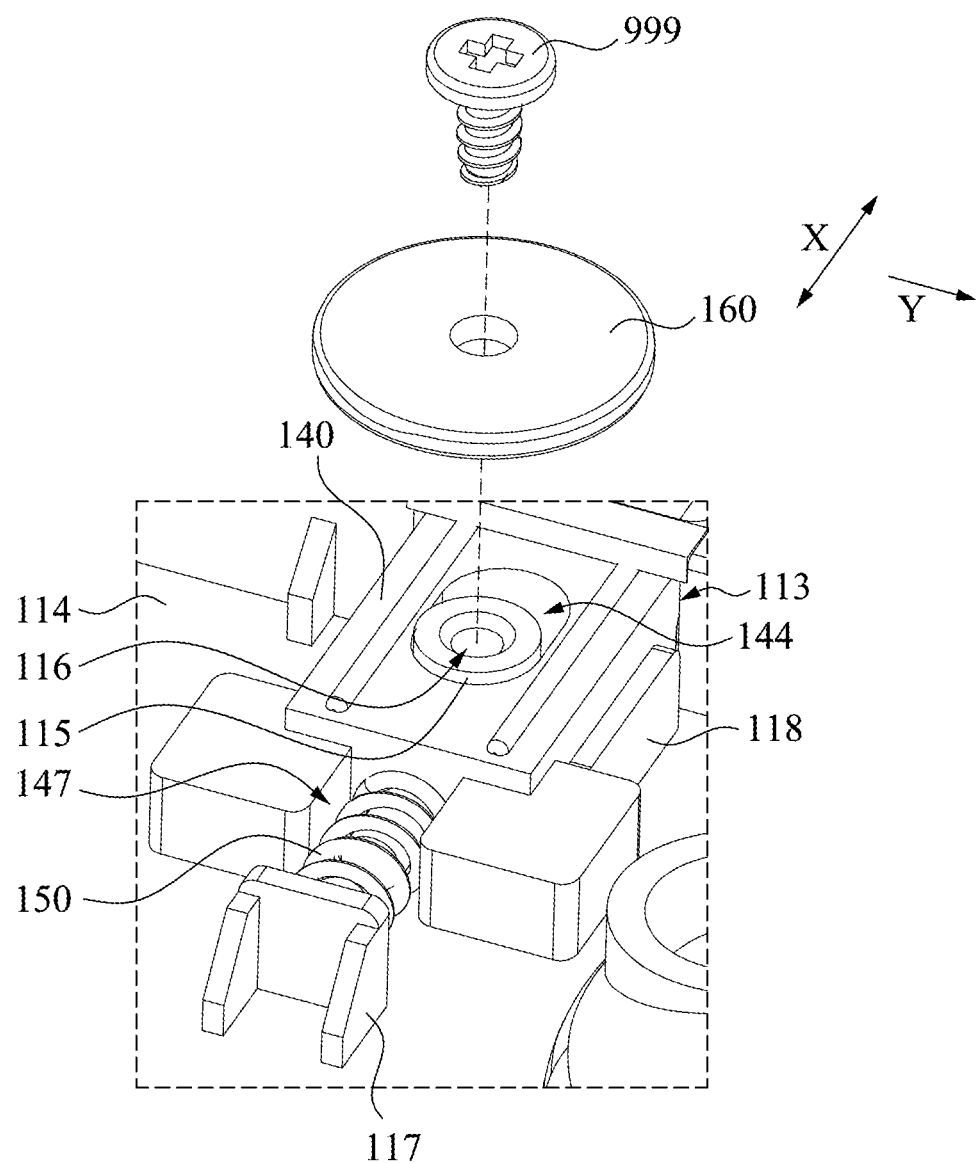
FIG. 4 illustrates an exploded view of some of the components of the charging case shown in FIG. 1.

Reference is made to FIG. 4 additionally, which illustrates an exploded view of some of the components of the charging case 100 shown in FIG. 1. The main body 110 has a wall portion 114 facing the lid 120 (when the lid 120 is closed). The frame 160 is fixed attached to the main body 110 and is positioned on a side of the slider 140 away from the wall portion 114, so as to prevent the slider 140 from moving in a normal direction of the wall portion 114. The slider 140 is configured to slide between the frame 160 and the wall portion 114. In other words, the accommodating space 112 is defined between the frame 160 and the wall portion 114. In some embodiments, the slider 140 has a slot 144. The slot 144 penetrates through the slider 140 from top to bottom. The main body 110 has a cylinder 115 protruding from the wall portion 114 and extending into the slot 144. The frame 160 is fixedly attached to the cylinder 115. Specifically, the cylinder 115 has a screw hole 116 on its tip, and the frame 160 is secured to the tip of the cylinder 115 by a screw 999. In the axial direction X, the slot 144 is greater in width than the cylinder 115, such that the slider 140 can slide along the axial direction X under the guidance of the cylinder 115. In some embodiments, the frame 160 includes metal, engineering plastic, other suitable materials or any combination thereof.

As shown in FIG. 4, in some embodiments, the cylinder 115 is a circular cylinder. The wall portion 114 has two guiding pieces 118 (only one is depicted). In a direction Y perpendicular to the axial direction X, the two guiding pieces 118 are positioned on two opposite sides of the slider 140. The guiding pieces 118 serve to prevent the slider 140 from moving in the direction Y, and the slider 140 can thus slide straight along the axial direction X.

As shown in FIGS. 2 and 3, the return mechanism 150 is connected to the slider 140 and is configured to provide the slider 140 with a force in the axial direction X. The slider 140 reciprocates along the axial direction X as being driven by the return mechanism 150 and the guiding bump 123. In the present embodiment, the return mechanism 150 is a tension spring. The wall portion 114 of the main body 110 has a fixing portion 117. One end of the spring is connected to the fixing portion 117, and the other end of the spring is connected to an end of the slider 140 away from the guiding bump 123. In an alternative embodiment, the return mechanism may include two magnets. The two magnets may be disposed on the fixing portion 117 and the end of the slider 140 away from the guiding bump 123 respectively and face each other with the same magnetic pole (north pole or south pole).

As shown in FIG. 2, when the lid 120 is in the closed state, the guiding bump 123 of the lid 120 exits the recessed portion 143 of the slider 140, at which point the slider 140 is at a first position. In some embodiments, the slider 140 is configured to abut against the connecting portion 121 of the lid 120 when the lid 120 is in the closed state to impede the rotation of the lid 120, such that the lid 120 cannot be opened too easily. The engaging portion 141 of the slider 140 is on a moving path of a tip 123a of the guiding bump 123. Therefore, when the user opens the lid 120 such that the lid 120 rotates clockwise, the guiding bump 123 interferes with the engaging portion 141, such that the slider 140 retracts from the first position and compresses the spring (i.e., the return mechanism 150). A contact point at which the guiding bump 123 contacts the engaging portion 141 displaces as the angle between the lid 120 and the main body 110 increases. When the contact point is at the tip 123a of the guiding bump 123, the spring reaches its maximum compression, at which point the slider 140 is at a second position.

Following the discussion in the previous paragraph, when the contact point passes through the tip 123a, the slider 140 moves from the second position towards the first position as being driven by the spring force. In the meantime, under the guidance of the slider 140, the tip 123a of the guiding bump 123 would slide to the abutting surface 146 and the guiding bump 123 would abut to the restricting flange 142, at which point the slider 140 moves back to the first position as shown in FIG. 3 and the guiding bump 123 is completely fitted into the recessed portion 143, such that the lid 120 is held at the predetermined angle θ2 to the main body 110. In other words, after the contact point passes through the tip 123a, the user is not required to manually rotate the lid 120 as the lid 120 will open automatically due to the interaction between the actuating assembly 130 and the guiding bump 123.

As shown in FIGS. 2 and 3, the fixing portion 117 includes a base 117a and a tab 117b. The base 117a is connected to the wall portion 114. The tab 117b is disposed on the base 117a and protrudes towards the slider 140. The slider 140 has a depression 147 (see FIG. 4) located on a side of the slider 140 facing the fixing portion 117. A tab 148 is formed on a bottom surface of the depression 147. One end of the spring (i.e., the return mechanism 150) is fitted onto the tab 117b and abuts against the base 117a, while the other end of the spring is fitted onto the tab 148 and abuts against the bottom surface of the depression 147.

As shown in FIGS. 2 and 3, in some embodiments, when the slider 140 is at the first position, the cylinder 115 abuts against an end of the slot 144 away from the guiding bump 123, at which point a distance D1 between the bottom surface of the depression 147 (at which an end of the spring contacts the slider 140) and the base 117a (at which the spring is fixed on the main body 110) is shorter than a free length of the spring (i.e., the length of the spring when the spring is not under any external load). In other words, the slider 140 is obstructed by the cylinder 155 (i.e., the cylinder 155 acts as a stopper for the slider 140) such that the first position is the rightmost position that the slider 140 can reach and the spring is compressed when the slider 140 is at the first position. By this arrangement, the recessed portion 143 of the slider 140 can firmly engage the guiding bump 123 of the lid 120 to maintain the angle between the lid 120 and the main body 110 at the predetermined angle θ2.

Figure 5:
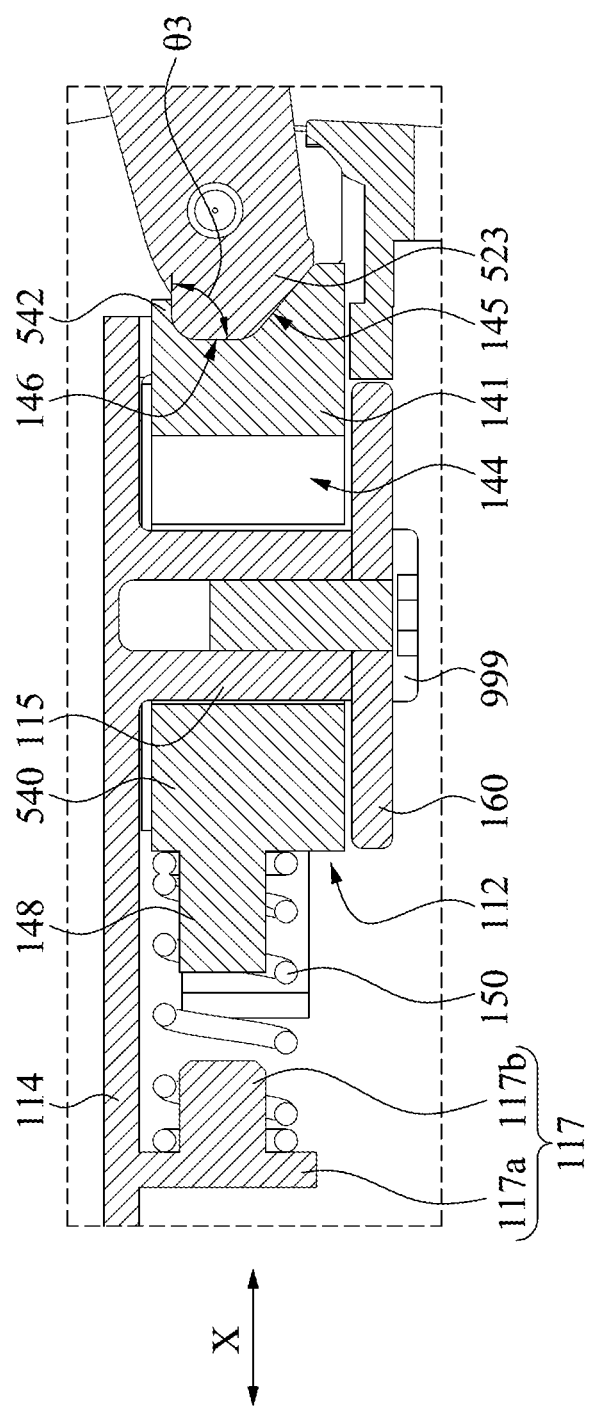
FIG. 5 illustrates a partially enlarged cross-sectional view of a charging case in accordance with another embodiment of the present disclosure.

Reference is made to FIG. 5, which illustrates a partially enlarged cross-sectional view of a charging case in accordance with another embodiment of the present disclosure. Like reference numerals refer to like elements that are substantially identical to those of the embodiments discussed previously. Descriptions regarding these elements will not be repeated for brevity. The present embodiment differs from the embodiment shown in FIGS. 1-4 in that the recessed portion of the slider 540/the guiding bump 523 of the lid is shaped differently from the recessed portion 143/the guiding bump 123 of the charging case 100. Specifically, in the present embodiment, the restricting flange 542 and the abutting surface 146 of the engaging portion 141 are in a normal arrangement, in other words, an angle 83 between the abutting surface 146 and the restricting flange 542 is substantially 90 degrees. The guiding bump 523 and the recessed portion of the slider 540 (formed by the restricting flange 542, the sloping surface 145 and the abutting surface 146) are substantially complementary in shape. This structural configuration may prevent the user from overly rotating the lid such that the angle between the lid and the main body exceeds the predetermined angle θ2.

Figure 6:
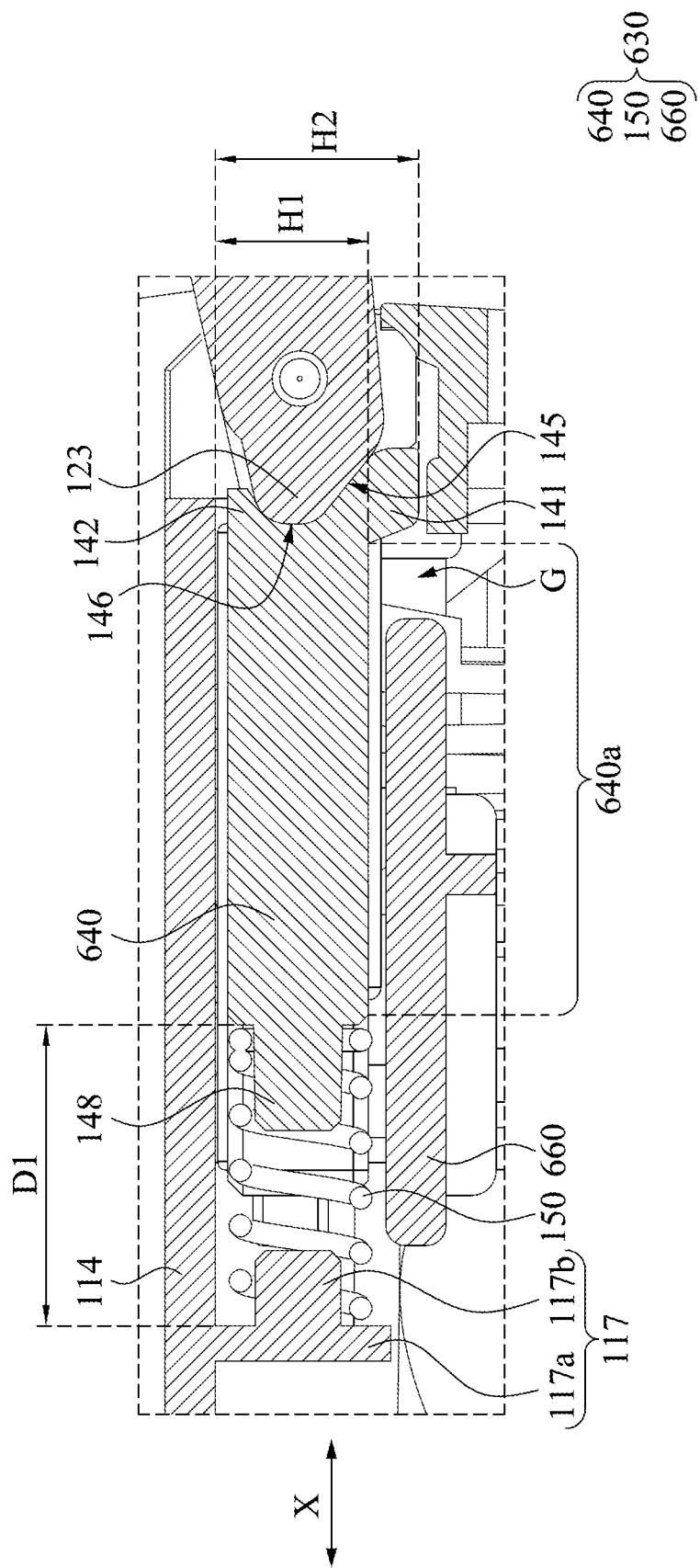
FIG. 6 illustrates a partially enlarged cross-sectional view of a charging case in accordance with another embodiment of the present disclosure.
Figure 7:
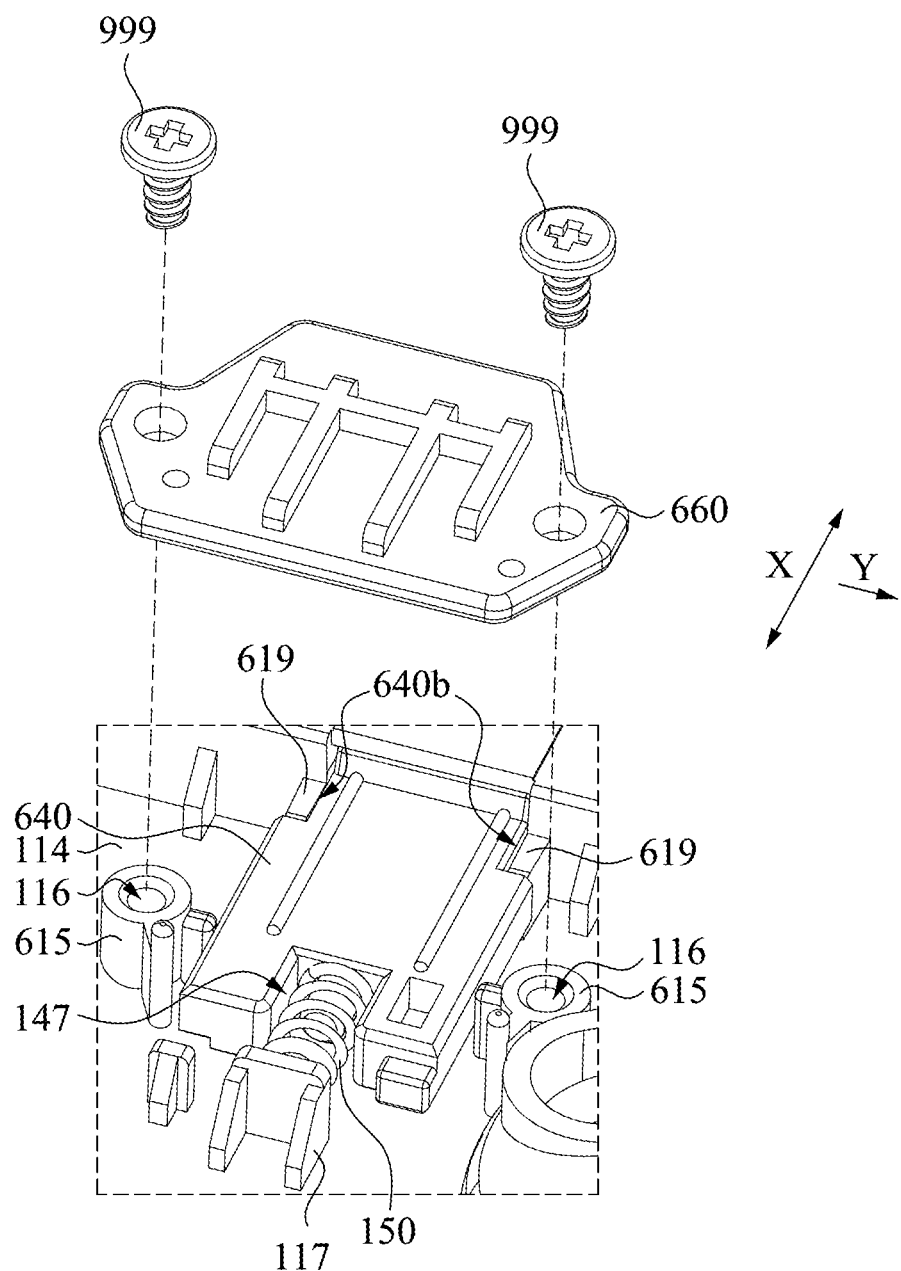
FIG. 7 illustrates an exploded view of some of the components of the charging case shown in FIG. 6.

Reference is made to FIGS. 6 and 7. FIG. 6 illustrates a partially enlarged cross-sectional view of a charging case in accordance with another embodiment of the present disclosure. FIG. 7 illustrates an exploded view of some of the components of the charging case shown in FIG. 6. Like reference numerals refer to like elements that are substantially identical to those of the embodiments discussed previously. Descriptions regarding these elements will not be repeated for brevity.

The present embodiment differs from the embodiment shown in FIGS. 1-4 in that: (1) the slider 640 is formed without the slot; (2) the main body has two cylinders 615 extending from the wall portion 114, the two cylinders 615 are located on two opposite sides of the slider 640 in the direction Y; the cylinders 615 prevent the slider 640 from moving in the direction Y, and the slider 640 can thus slide straight along the axial direction X; (3) in the direction Y, a maximum width of the frame 660 is greater than a width of the slider 640, and the frame 660 is secured to the screw holes 116 of the cylinders 615 by two screws 999.

As shown in FIG. 6, in some embodiments, the slider 640 has an indented section 640a. The indented section 640a is on a surface of the slider 640 away from the wall portion 114. As measured from the wall portion 114, a height H1 of the indented section 640a is lower than a height H2 of the engaging portion 141. An orthogonal projection (i.e., projection along the direction perpendicular to the wall portion 114) of the frame 660 onto the slider 640 falls within the indented section 640a. By this arrangement, the overall thickness of the actuating assembly 630 may be reduced. In some embodiments, when the slider 640 is at the first position (i.e., the position of the slider 640 when the guiding bump 123 completely exits the recessed portion or when the guiding bump 123 is fitted into the recessed portion such that the lid is held at the predetermined angle θ2 to the main body), the frame 660 is spaced from an end of the indented section 640a facing the guiding bump 123 by a gap G. When the slider 640 is pushed by the guiding bump 123 due to the swinging motion of the guiding bump 123, the gap G provides space for the slider 640 to retract. In some embodiments, a width of the gap G in the axial direction X is substantially 1.7 mm.

As shown in FIG. 7, in some embodiments, the slider 640 has at least one cutout 640b on its side wall and located on the end adjacent to the guiding bump 123. The main body further includes at least one stopper 619 disposed on the wall portion 114. When the slider 640 is at the first position, the stopper 619 is located within the cutout 640b and abuts against the slider 640, at which point the distance D1 between the bottom surface of the depression 147 of the slider 640 and the base 117a is shorter than a free length of the spring (i.e., the return mechanism 150), as shown in FIG. 6, such that the spring is compressed. By this arrangement, the recessed portion of the slider 640 can firmly engage the guiding bump 123 to maintain the angle between the lid and the main body at the predetermined angle θ2.

Figure 8:
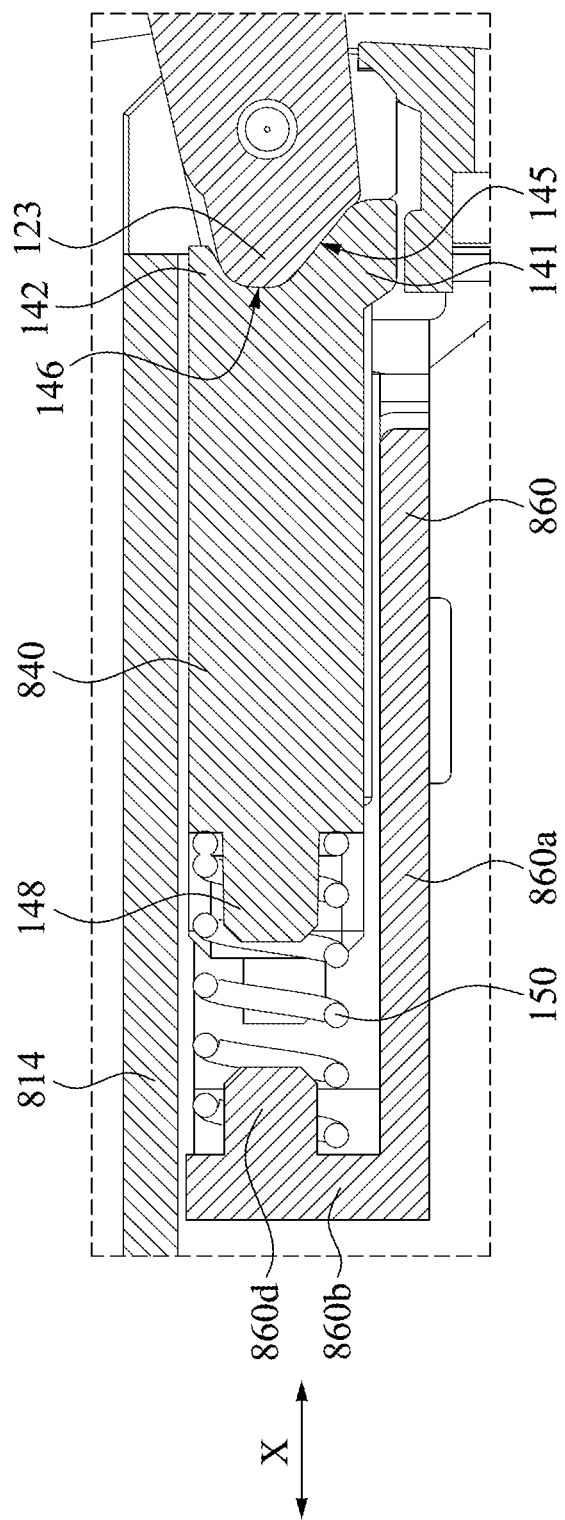
FIG. 8 illustrates a partially enlarged cross-sectional view of a charging case in accordance with another embodiment of the present disclosure.
Figure 9:
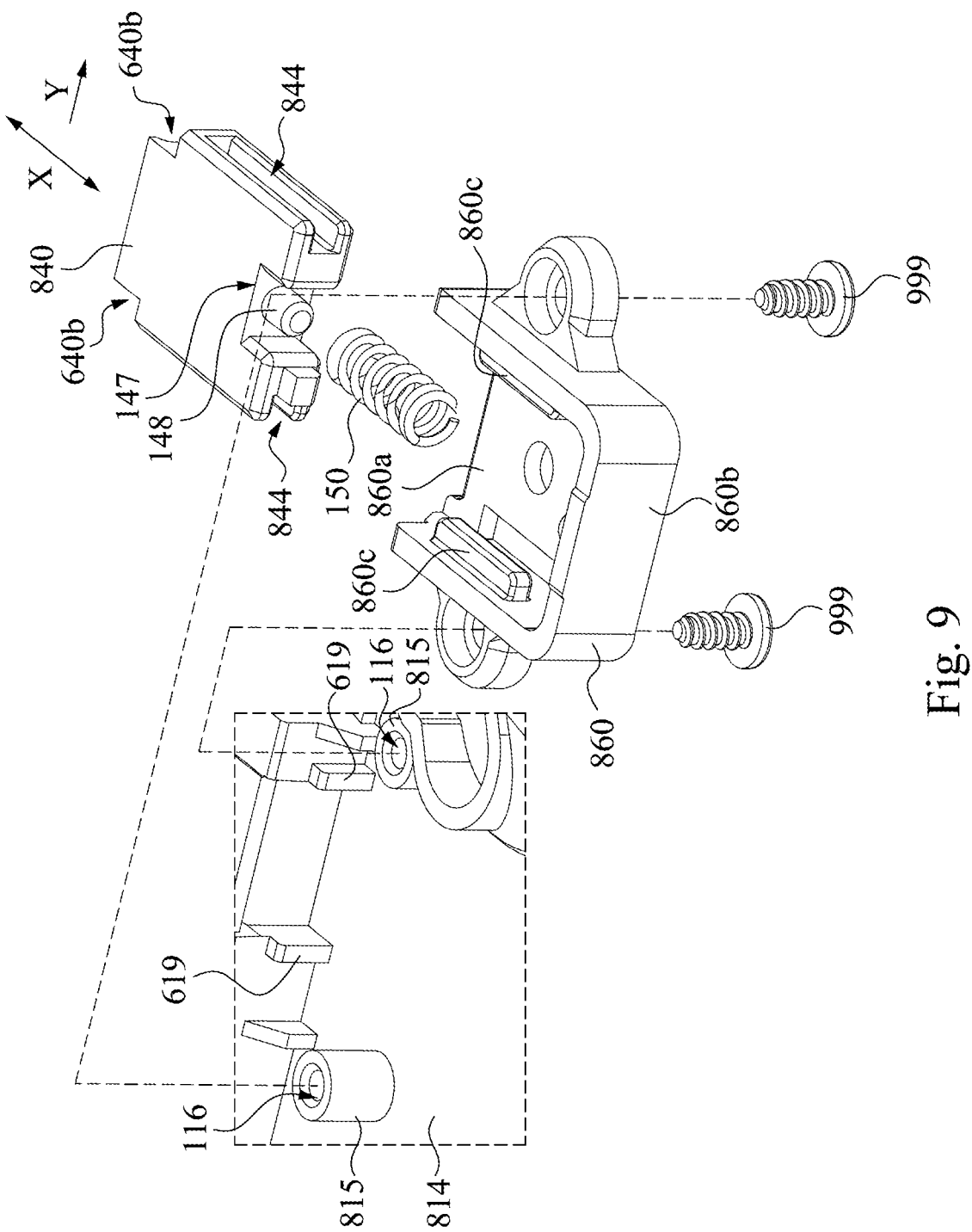
FIG. 9 illustrates an exploded view of some of the components of the charging case shown in FIG. 8.

Reference is made to FIGS. 8 and 9. FIG. 8 illustrates a partially enlarged cross-sectional view of a charging case in accordance with another embodiment of the present disclosure. FIG. 9 illustrates an exploded view of some of the components of the charging case shown in FIG. 8. Like reference numerals refer to like elements that are substantially identical to those of the embodiments discussed previously. Descriptions regarding these elements will not be repeated for brevity.

The present embodiment differs from the embodiment shown in FIGS. 1-4 in that: (1) the main body has two cylinders 815 extending from the wall portion 814, the two cylinders 815 are located on two opposite sides of the slider 840 in the direction Y; (2) the frame 860 is secured to the screw holes 116 of the cylinders 815 by two screws 999; (3) the frame 860 has a bottom plate 860a and an U-shaped side wall 860b connected to the bottom plate 860a; (4) the frame 860 has at least one rail 860c protruding from the side wall 860b and extending along the axial direction X; the slider 840 has at least one slot 844 on its side surface and extending along the axial direction X; the slot 844 is slidably connected to the rail 860c, and the slider 840 can thus move straight along the axial direction X under the guidance of the rail 860c; (5) the wall portion 814 no longer has the fixing portion; the frame 860 has a tab 860d positioned to face the tab 148 of the slider 840; one end of the spring (i.e., the return mechanism 150) is fitted onto the tab 860d and abuts against the side wall 860b of the frame 860, while the other end of the spring is fitted onto the tab 148 and abuts against the bottom surface of the depression 147.

Figure 10:
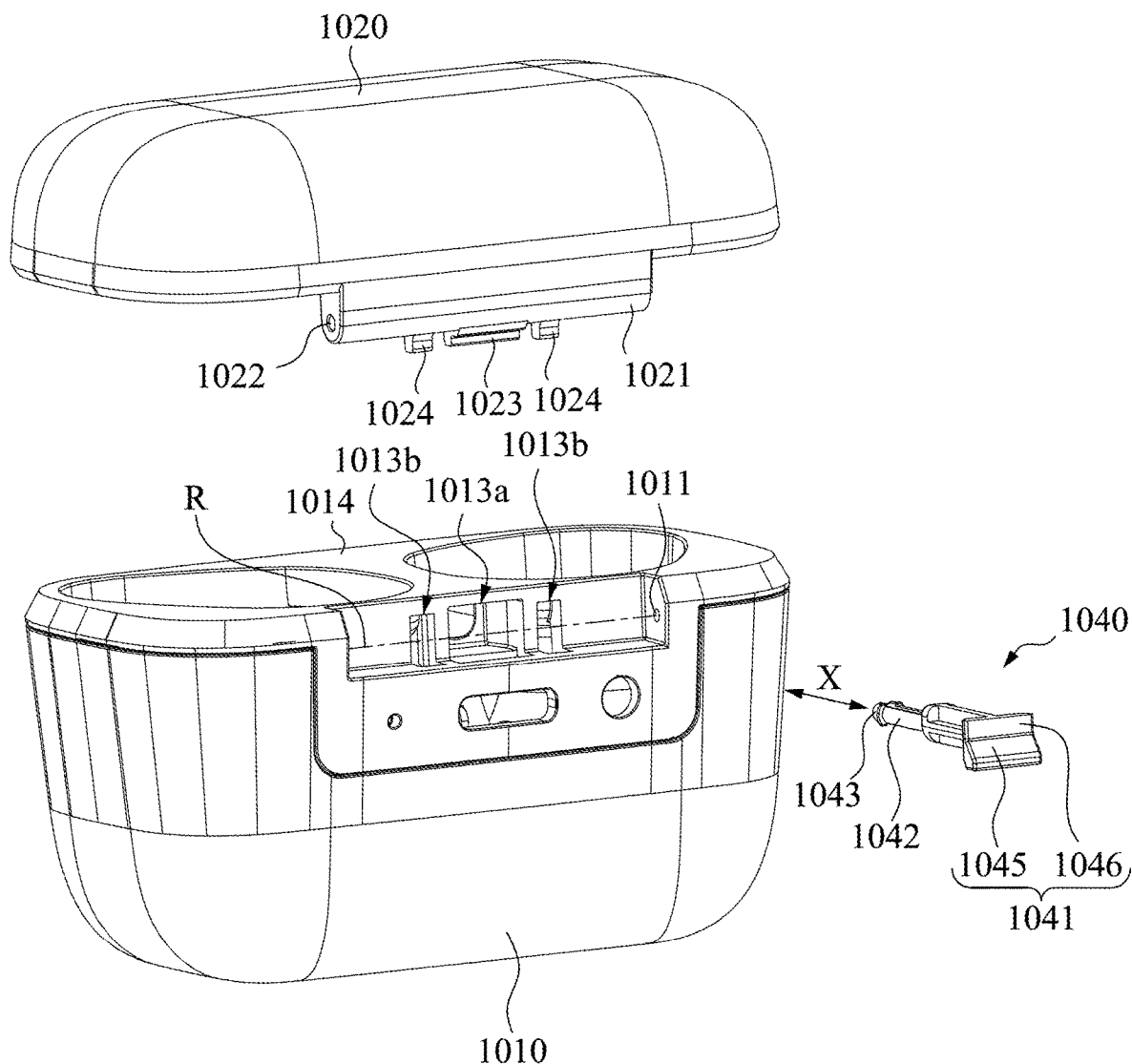
FIG. 10 illustrates an exploded view of a charging case in accordance with another embodiment of the present disclosure.
Figure 11:
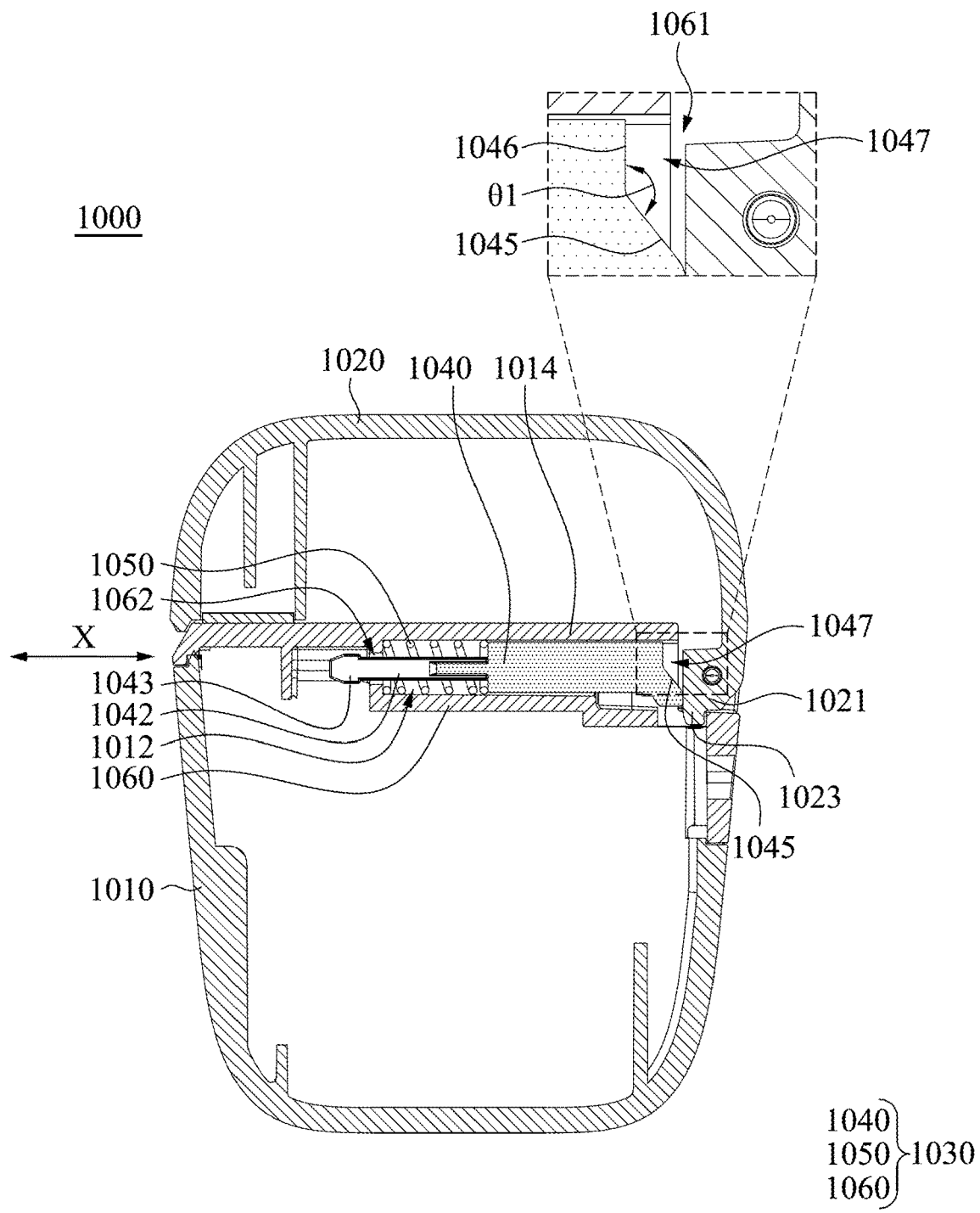
FIG. 11 illustrates an assembled cross-sectional view of the charging case shown in FIG. 10, with the lid of the charging case being in a closed state.
Figure 12:
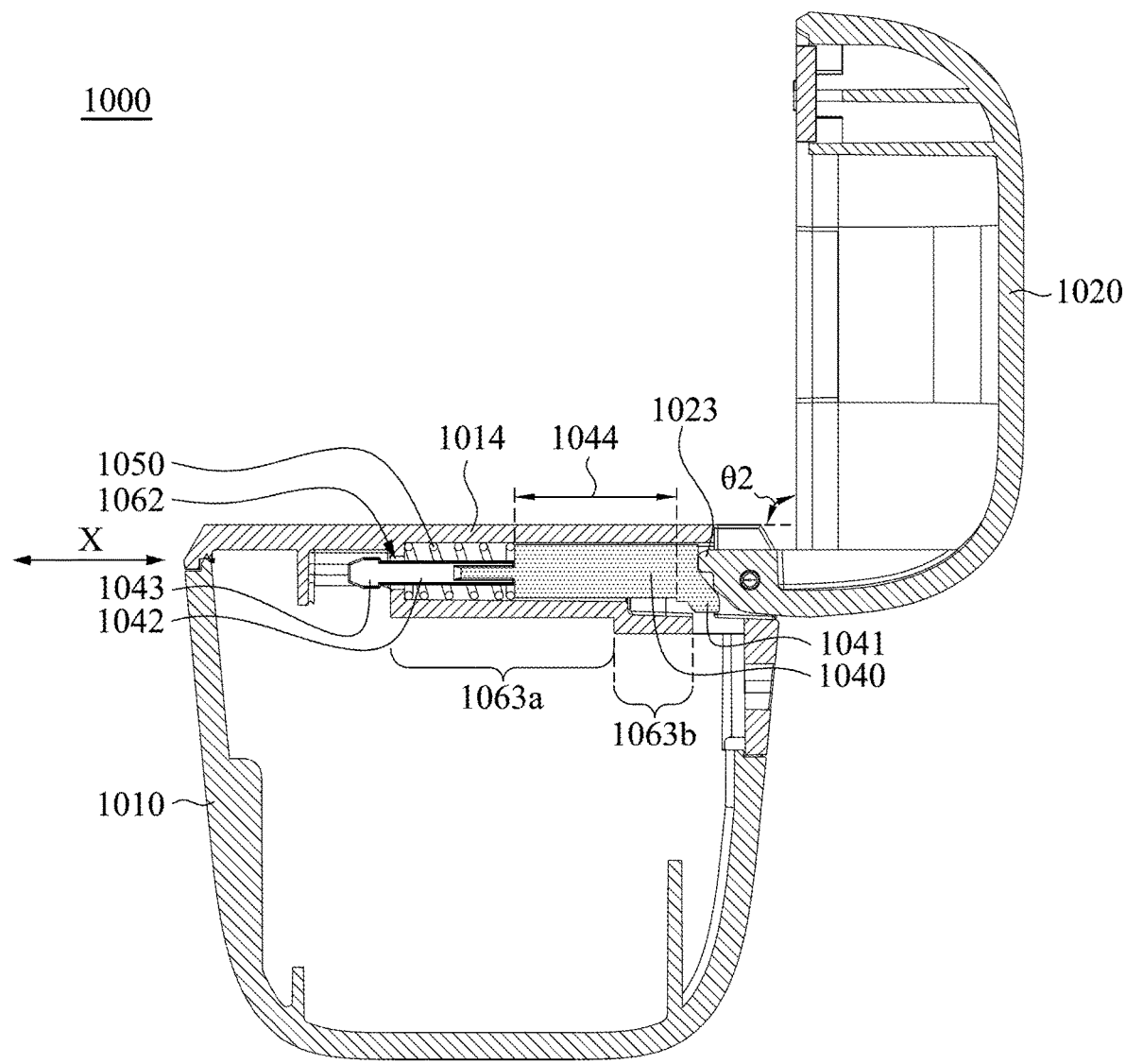
FIG. 12 illustrates an assembled cross-sectional view of the charging case shown in FIG. 10, with the lid of the charging case being in an open state and the cross section passing through a guiding bump of the lid.

Reference is made to FIGS. 10-13. The charging case 1000 includes a main body 1010, a lid 1020 and an actuating assembly 1030. As shown in FIG. 10, the lid 1020 has a connecting portion 1021. The connecting portion 1021 has two pivots 1022 (only one is depicted) on its opposite sides. The pivots 1022 are pivotably connected to two pivots 1011 (only one is depicted) of the main body 1010 respectively, such that the lid 1020 may be rotated and be switched between an open state (e.g., the state of the lid 1020 as shown in FIG. 12) and a closed state (e.g., the state of the lid 1020 as shown in FIG. 11). The lid 1020 further has a guiding bump 1023 protruding from the bottom of the connecting portion 1021. The guiding bump 1023 swings as the lid 1020 is opened or closed. The guiding bump 1023 is configured to swing about a rotation axis R which passes through the two pivots 1011.

As shown in FIGS. 11 and 12, the main body 1010 is a hollow housing structure. The actuating assembly 1030 is disposed in the main body 1010 and includes a slider 1040, a return mechanism 1050 and a frame 1060. The main body 1010 has a wall portion 1014. The frame 1060 is fixedly disposed on the wall portion 1014 (specifically, the frame 1060 is formed on the wall portion 1014, i.e., the frame 1060 and the wall portion 1014 are integrally formed), and an accommodating space 1012 is formed between the frame 1060 and the wall portion 1014. The accommodating space 1012 extends along an axial direction X. The slider 1040 is slidably disposed in the accommodating space 1012, in other words, the accommodating space 1012 is a sliding space for the slider 1040. In some embodiments, the axial direction X is nonparallel to the rotation axis R. In some embodiments, the axial direction X is perpendicular to the rotation axis R.

As shown in FIGS. 11 and 12, the slider 1040 includes an engaging portion 1041. The engaging portion 1041 and the wall portion 1014 form a concavity 1047. Specifically, the engaging portion 1041 includes a sloping surface 1045 and an abutting surface 1046 connected to each other. The abutting surface 1046 is located between the sloping surface 1045 and the wall portion 1014. In some embodiments, an angle θ1 between the abutting surface 1046 and the sloping surface 1045 substantially ranges from 30 degrees to 180 degrees, and is preferably 135 degrees.

As shown in FIGS. 11 and 12, the engaging portion 1041 is positioned corresponding to the guiding bump 1023 of the lid 1020 and slidably engages the guiding bump 1023. The slider 1040 is configured to reciprocate along the axial direction X as the guiding bump 1023 swings and pushes the engaging portion 1041. In some embodiments, as shown in FIG. 10, the main body 1010 has an opening 1013a located between the two pivots 1011, and the engaging portion 1041 slidably engages the guiding bump 1023 though the opening 1013a.

As shown in FIGS. 11 and 12, the return mechanism 1050 is connected to the slider 1040 and is configured to provide the slider 1040 with a force in the axial direction X. The slider 1040 reciprocates along the axial direction X as being driven by the return mechanism 1050 and the guiding bump 1023. In the present embodiment, the return mechanism 150 is a tension spring extending along the axial direction X and being compressed between the slider 1040 and the frame 1060. Under the viewing angles of FIGS. 11 and 12, the spring provides a force that pushes the sliding member 1040 towards the right.

Figure 13:
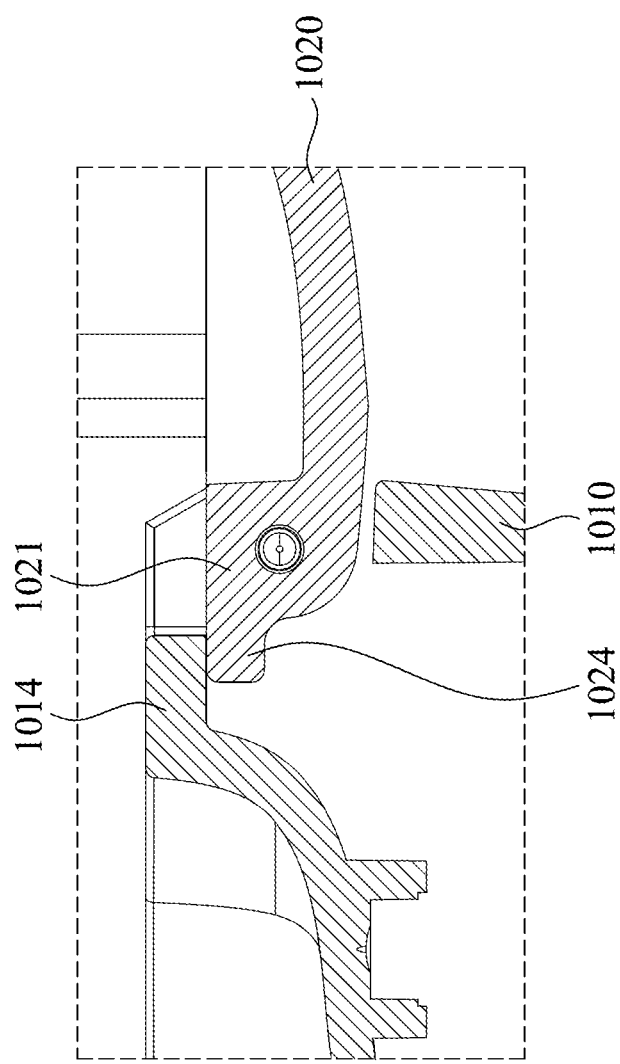
FIG. 13 illustrates an assembled cross-sectional view of the charging case shown in FIG. 10, with the lid of the charging case being in an open state and the cross section passing through a rib structure of the lid.

As shown in FIGS. 10 and 13, the lid 1020 further has at least one rib structure 1024 located on a side of the guiding bump 1023. When the lid 1020 is in the open state, the rib structure 1024 abuts against the wall portion 1014, so as to impede rotation of the lid 1020 and to hold the lid 1020 at a predetermined angle θ2 to the main body 1010. In some embodiments, the predetermined angle θ2 substantially ranges from 70 degrees to 100 degrees.

As shown in FIGS. 10 and 13, in some embodiments, the lid 1020 has two rib structures 1024 located on opposite sides of the guiding bump 1023. The main body 1010 has two openings 1013b for the two rib structures 1024 to pass through to abut to the wall portion 1014. In some embodiments, the rib structure 1024 is greater in length than the guiding bump 1023, so as to solidly limit the opening angle of the lid 1020. Specifically, a length by which the rib structure 1024 extends from the connecting portion 1021 is greater than a length by which the guiding bump 1023 extends from the connecting portion 1021.

As shown in FIGS. 11 and 12, the frame 1060 has an entrance 1061 and a thru-hole 1062. The entrance 1061 faces the guiding bump 1023, and the thru-hole 1062 is positioned opposite to the entrance 1061. The slider 1040 further includes an extending portion 1042 and a snap portion 1043. The extending portion 1042 is located between the snap portion 1043 and the engaging portion 1041, and the extending portion 1042 passes through the thru-hole 1062. The tension spring (i.e., the return mechanism 1050) is located inside the accommodating space 1012 and fitted on the extending portion 1042.

As shown in FIGS. 11 and 12, when assembling the charging case 1000, the spring may be fitted onto the extending portion 1042 first. Subsequently, the slider 1040 and the spring fitted thereon may be inserted into the frame 1060 together through the entrance 1061, until the snap portion 1043 passes through the thru-hole 1062, such that the slider 1040 is connected to the frame 1060 and that the spring is compressed between the slider 1040 and the frame 1060. The assembly process as described may be carried out without any additional tool and can be completed quickly.

As shown in FIGS. 11 and 12, when the lid 1020 is in the closed state, the guiding bump 1023 exits the concavity 1047. On the other hand, when the lid 1020 is in the open state, the guiding bump 1023 enters the concavity 1047 and abuts against the abutting surface 1046. In some embodiments, when the lid 1020 is in the closed state, the slider 1040 abuts against the lid 1020, and the spring (i.e., the return mechanism 1050) is in a compressed state such that the spring exerts a rightward force on the lid 1020 to impede rotation of the lid 1020, thereby preventing the lid 1020 from opening inadvertently.

As shown in FIGS. 11 and 12, the frame 1060 includes a first guiding portion 1063a and a second guiding portion 1063b. The second guiding portion 1063b is located between the entrance 1061 of the frame 1060 and the first guiding portion 1063a. The first guiding portion 1063a and the second guiding portion 1063b have a step therebetween. Specifically, a distance between the first guiding portion 1063a and the wall portion 1014 is less than a distance between the second guiding portion 1063b and the wall portion 1014. The slider 1040 has an indented section 1044. The indented section 1044 is on a surface of the slider 1040 away from the wall portion 1014. The indented section 1044 and the engaging portion 1041 slidably engage the first guiding portion 1063a and the second guiding portion 1063b respectively. By this arrangement, the space occupied by the actuating assembly 1030 may be reduced, and a foolproof function may be provided additionally, which prevents the assembler from inserting the slider 1040 into the frame 1060 upside down.

Figure 14:
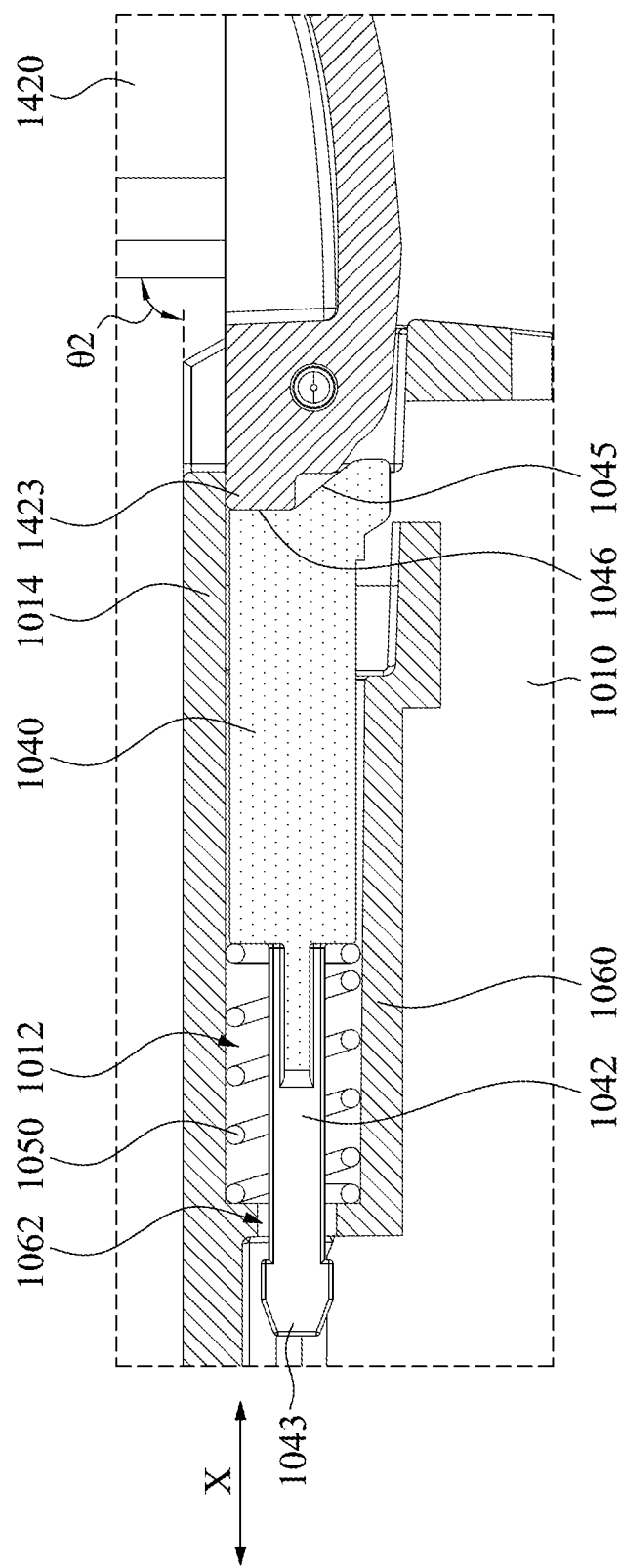
FIG. 14 illustrates a partially enlarged cross-sectional view of a charging case in accordance with another embodiment of the present disclosure.

Reference is made to FIG. 14, which illustrates a partially enlarged cross-sectional view of a charging case in accordance with another embodiment of the present disclosure. The present embodiment differs from the embodiment shown in FIGS. 10-13 in that the lid 1420 does not have any rib structure and utilizes the guiding bump 1423 of the lid 1420 to abut against the wall portion 1014 of the main body 1010. Specifically, when the lid 1420 is in the open state, the guiding bump 1423 abuts against the wall portion 1014, so as to impede rotation of the lid 1420 and to hold the lid 1420 at the predetermined angle θ2 to the main body 1010.

In sum, the charging case of the present disclosure includes a slider featured with a recessed portion which a guiding bump of the lid can swing into and out of. With the assistance of a return mechanism, the recessed portion can firmly engage the guiding bump to maintain the angle at which the lid is opened. By this arrangement, problems found in conventional hinge structures for charging cases, such as wear, inability to hold the lid at a fixed angle, and having large size, may be resolved.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A charging case, comprising:
   a main body having an accommodating space, the accommodating space extending along an axial direction;
   a lid pivotably connected to the main body to be switched between an open state and a closed state, wherein the lid has a guiding bump which swings as the lid is opened or closed; and
   an actuating assembly, comprising:
      a slider slidably disposed in the accommodating space and comprising an engaging portion, wherein the engaging portion is positioned corresponding to the guiding bump, the slider is configured to reciprocate along the axial direction as the guiding bump swings and pushes the engaging portion, wherein the engaging portion comprises a sloping surface and an abutting surface connected to each other; and
      a return mechanism connected to the slider and configured to provide the slider with a force in the axial direction.

2. The charging case of claim 1, wherein an angle between the abutting surface and the sloping surface substantially ranges from 30 degrees to 180 degrees.

3. The charging case of claim 1, wherein the actuating assembly further comprises a frame fixedly disposed on the main body, wherein the accommodating space is defined between the frame and a wall portion of the main body.

4. The charging case of claim 3, wherein the lid has a rib structure located on a side of the guiding bump, when the lid is in the open state, the rib structure abuts against the wall portion, so as to impede rotation of the lid and to hold the lid at a predetermined angle to the main body.

5. The charging case of claim 4, the rib structure is greater in length than the guiding bump.

6. The charging case of claim 3, wherein the engaging portion and the wall portion form a concavity, when the lid is in the open state, the guiding bump abuts against the wall portion, so as to impede rotation of the lid and to hold the lid at a predetermined angle to the main body.

7. The charging case of claim 3, wherein the frame has an entrance and a thru-hole, the entrance faces the guiding bump, the thru-hole is positioned opposite to the entrance, the slider further comprises an extending portion and a snap portion, the extending portion is located between the snap portion and the engaging portion, and the extending portion passes through the thru-hole, wherein the return mechanism comprises a spring located inside the accommodating space and fitted on the extending portion.

8. The charging case of claim 3, wherein the frame comprises a first guiding portion and a second guiding portion, a distance between the first guiding portion and the wall portion is less than a distance between the second guiding portion and the wall portion, the slider has an indented section, the indented section is on a surface of the slider away from the wall portion, the indented section and the engaging portion slidably engage the first guiding portion and the second guiding portion respectively.

9. The charging case of claim 1, wherein the slider further comprises a restricting flange formed on the engaging portion, when the lid is in the open state, the guiding bump abuts against the restricting flange, so as to impede rotation of the lid and to hold the lid at a predetermined angle to the main body.

10. The charging case of claim 9, wherein the engaging portion and the restricting flange collectively form a recessed portion.

11. The charging case of claim 10, wherein the recessed portion and the guiding bump are substantially complementary in shape.

12. The charging case of claim 10, wherein the lid is in the closed state when the guiding bump exits the recessed portion.

13. The charging case of claim 9, wherein the predetermined angle substantially ranges from 70 degrees to 100 degrees.

14. The charging case of claim 9, wherein the slider has a slot, the main body has a cylinder protruding from a wall portion of the main body and extending into the slot.

15. The charging case of claim 9, wherein the actuating assembly further comprises a frame fixedly attached to the main body, and the accommodating space is defined between the frame and a wall portion of the main body.

16. The charging case of claim 15, wherein the slider has an indented section, the indented section is on a surface of the slider away from the wall portion, an orthogonal projection of the frame onto the slider falls within the indented section.

17. The charging case of claim 16, wherein the frame is spaced from an end of the indented section facing the guiding bump by a gap.

18. The charging case of claim 15, wherein the frame has a rail, and the slider has a slot slidably connected to the rail.

19. The charging case of claim 18, wherein the rail protrudes from a side wall of the frame.

20. The charging case of claim 1, wherein the guiding bump is configured to swing about a rotation axis, the rotation axis is nonparallel to the axial direction along which the accommodating space extends.

* * * * *